United States Patent
Kuo et al.

(10) Patent No.: US 10,733,854 B2
(45) Date of Patent: Aug. 4, 2020

(54) EMERGENCY LIGHTING SYSTEM WITH AUTONOMOUS EGRESS MAPPING

(71) Applicant: Magtech Industries Corporation, Las Vegas, NV (US)

(72) Inventors: Michael Kuo, Las Vegas, NV (US); Jun Wang, Las Vegas, NV (US)

(73) Assignee: Magtech Industries Corporation, Las Vegas, NV (US)

( * ) Notice: Subject to any disclaimer, the term of this patent is extended or adjusted under 35 U.S.C. 154(b) by 0 days.

(21) Appl. No.: 16/594,939

(22) Filed: Oct. 7, 2019

(65) Prior Publication Data

US 2020/0051408 A1 Feb. 13, 2020

Related U.S. Application Data

(63) Continuation of application No. 16/027,184, filed on Jul. 3, 2018, now Pat. No. 10,438,462.

(51) Int. Cl.
| | | |
|---|---|---|
| *G08B 29/00* | (2006.01) | |
| *G08B 7/06* | (2006.01) | |
| *H02J 9/02* | (2006.01) | |
| *G08B 21/02* | (2006.01) | |
| *H04B 17/318* | (2015.01) | |
| *H04W 4/33* | (2018.01) | |
| *H04W 4/90* | (2018.01) | |

(52) U.S. Cl.
CPC ............. *G08B 7/066* (2013.01); *G08B 7/062* (2013.01); *G08B 21/02* (2013.01); *H02J 9/02* (2013.01); *H04B 17/318* (2015.01); *H04W 4/33* (2018.02); *H04W 4/90* (2018.02)

(58) Field of Classification Search
CPC ........ H04B 17/318; H04W 4/33; H04W 4/90; G08B 7/066; G08B 7/062; G08B 21/02; H02J 9/02
USPC ......................................................... 340/516
See application file for complete search history.

(56) References Cited

U.S. PATENT DOCUMENTS

| | | | | |
|---|---|---|---|---|
| 6,420,970 B1* | 7/2002 | Kampmann | ............ | E05B 45/06 340/541 |
| 6,970,183 B1* | 11/2005 | Monroe | ................ | G08B 7/062 348/143 |
| 7,598,856 B1* | 10/2009 | Nick | .................... | G01C 21/206 340/539.13 |
| 2013/0169817 A1* | 7/2013 | Jones | .................... | G08B 25/14 348/159 |
| 2014/0167956 A1* | 6/2014 | Chu | ....................... | G01S 5/0231 340/539.13 |
| 2014/0340222 A1* | 11/2014 | Thornton | ................ | G08B 7/066 340/539.17 |
| 2015/0002292 A1* | 1/2015 | Cavalcanti | ............. | G08B 21/02 340/539.12 |

(Continued)

*Primary Examiner* — Naomi J Small
(74) *Attorney, Agent, or Firm* — Lightbulb IP, LLC

(57) ABSTRACT

An emergency lighting system provides autonomous mapping of egress locations of a building or other environment through a plurality of emergency lighting units. The emergency lighting units utilizes wireless signals to generate topology information that identifies the location of the emergency lighting units, the outermost emergency lighting units of which identify the egress locations of a building. During an emergency situation the emergency lighting system activates one or more illumination devices.

10 Claims, 7 Drawing Sheets

(56) References Cited

U.S. PATENT DOCUMENTS

2016/0049064 A1\* 2/2016 McNabb ................. G06F 16/29
340/540
2017/0131105 A1\* 5/2017 Buscemi .............. G01C 21/206
2017/0225336 A1\* 8/2017 Deyle .................... G06K 19/14

\* cited by examiner

EMERGENCY LIGHTING SYSTEM WITH AUTONOMOUS EGRESS MAPPING

CROSS-REFERENCE TO RELATED APPLICATION

This application is a continuation of U.S. patent application Ser. No. 16/027,184, filed Jul. 3, 2018.

BACKGROUND OF THE INVENTION

1. Field of the Invention

The invention relates building lighting systems and in particular to an emergency lighting system with autonomous egress mapping.

2. Related Art

Traditional emergency lighting systems activate illumination when a power loss occurs. Some systems are capable of activating illumination during a fire or other emergency. The illumination provides lighting and an evacuation signal, but without additional information that building occupants or management may find useful before or during an emergency.

From the discussion that follows, it will become apparent that the present invention addresses the deficiencies associated with the prior art while providing numerous additional advantages and benefits not contemplated or possible with prior art constructions.

SUMMARY OF THE INVENTION

An emergency lighting system is disclosed herein. As will be disclosed herein, the emergency lighting system autonomously maps the egress locations of a building or other environment. This is advantageous in mapping the building and its egress locations. The emergency lighting system may detect the location of occupants as well.

Various embodiments of the emergency lighting system are disclosed herein. For example, in one exemplary embodiment, an emergency lighting system for a building is disclosed. Such emergency lighting system comprises a plurality of emergency lighting units comprising one or more illumination devices and one or more communication devices. Topology information is generated based on relative signal strength of signals transmitted and received between the plurality of emergency lighting units via the communication devices.

One or more storage devices store the topology information. The topology information identifies the location of one or more outermost emergency lighting unites to identify the location of the egress locations of the building. Upon occurrence of an emergency situation, the illumination devices of at least one of the outermost emergency lighting units are activated.

At least one of the plurality of emergency lighting units may determine one or more occupant locations based on relative signal strength of signals of one or more mobile devices. The topology information may be remotely accessible.

In another exemplary embodiment, an emergency lighting system for a building comprises a plurality of emergency lighting units comprising one or more illumination devices and one or more communication devices. Topology information is generated based on relative signal strength of signals transmitted and received between the plurality of emergency lighting units via the communication devices.

The topology information identifies the location of one or more outermost emergency lighting unites to identify the location of the egress locations of the building. Upon occurrence of an emergency situation, the illumination devices of at least one of the outermost emergency lighting units are activated.

One or more storage devices may be provided to store the topology information. At least one of the plurality of emergency lighting units may determine one or more occupant locations based on relative signal strength of signals of one or more mobile devices. As noted above, the topology information may be remotely accessible.

In yet another embodiment, an emergency lighting system for a building comprises a plurality of emergency lighting units comprising one or more illumination devices and one or more communication devices. Topology information is generated based on relative signal strength of signals transmitted and received between the plurality of emergency lighting units via the communication devices, The topology information identifies the location of one or more outermost emergency lighting unites to identify the location of the egress locations of the building. The emergency lighting system determines one or more occupant locations based on relative signal strength of signals of one or more mobile devices. Upon occurrence of an emergency situation, the illumination devices of at least one of the outermost emergency lighting units are activated. One or more storage devices may store the topology information, and the topology information may be remotely accessible.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In one or more embodiments, an emergency lighting system provides autonomous mapping of egress locations, such as door or windows, within a building or other structure. In addition, an emergency lighting system may detect hazards and direct individuals, such as building occupants, to one or more of the mapped egress locations. An emergency lighting system may also provide illumination during a hazardous or emergency situation. Though described primarily in the context of emergency lighting, it will be understood that, in its various embodiments, the system herein may be provided as an autonomous mapping and occupant direction/evacuation system with or without an illumination component.

Figure 1:
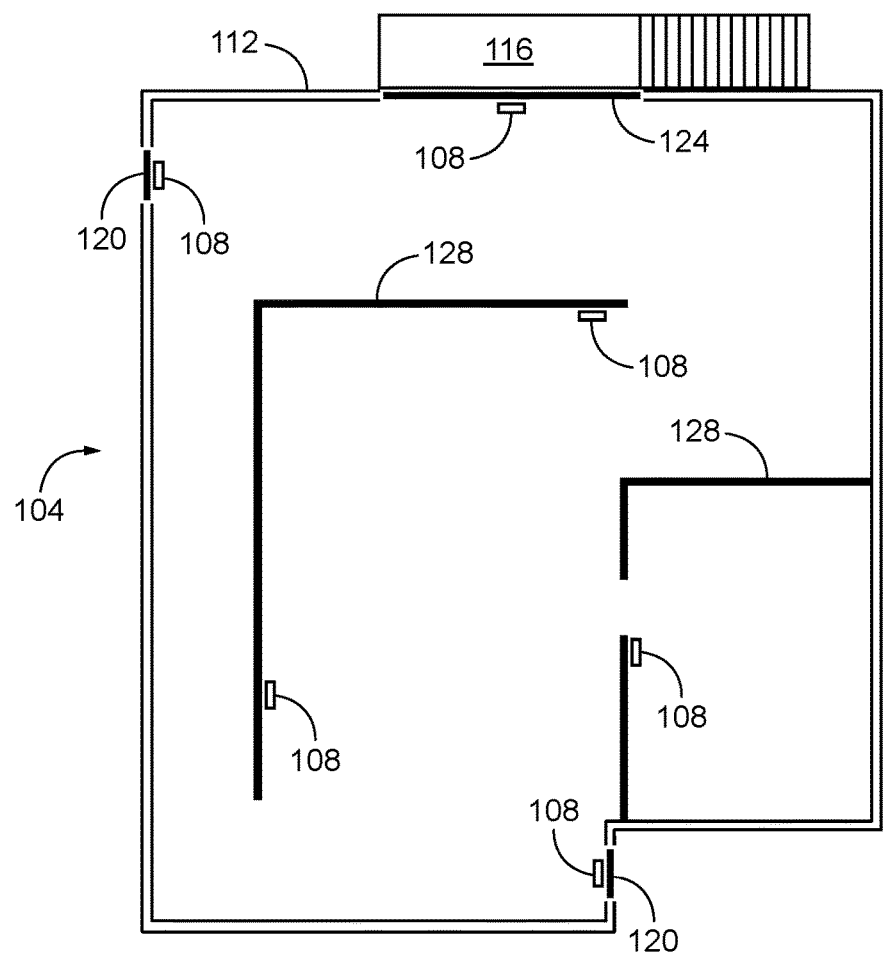
FIG. 1 illustrates an exemplary emergency lighting system in an environment of use.

FIG. 1 illustrates an exemplary emergency lighting system 104 comprising a plurality of emergency lighting units 108 in an environment of use. In particular, the environment of use is a building 112. As can be seen, emergency lighting units 108 can be installed at various locations of an environment. In FIG. 1 for instance, emergency lighting units 108 have been installed at interior walls 128 as well as doors 120 and windows 124 of the building 112. In the example of FIG. 1, the doors 120 and windows 124 function as egress locations in that occupants can exit the building at such locations. It is noted that the window 124 is adjacent a fire escape 116, for use in egressing the building 112.

Generally speaking, an emergency lighting unit 108, working in conjunction with one or more other emergency lighting units, may autonomously map an environment. Specifically, the emergency lighting units 108 may map an environment to automatically identify egress locations within the environment. If an emergency lighting unit 108 detects a hazard or emergency situation, occupants can be directed to one or more of the egress locations, preferably remote from the hazard.

Figure 2:
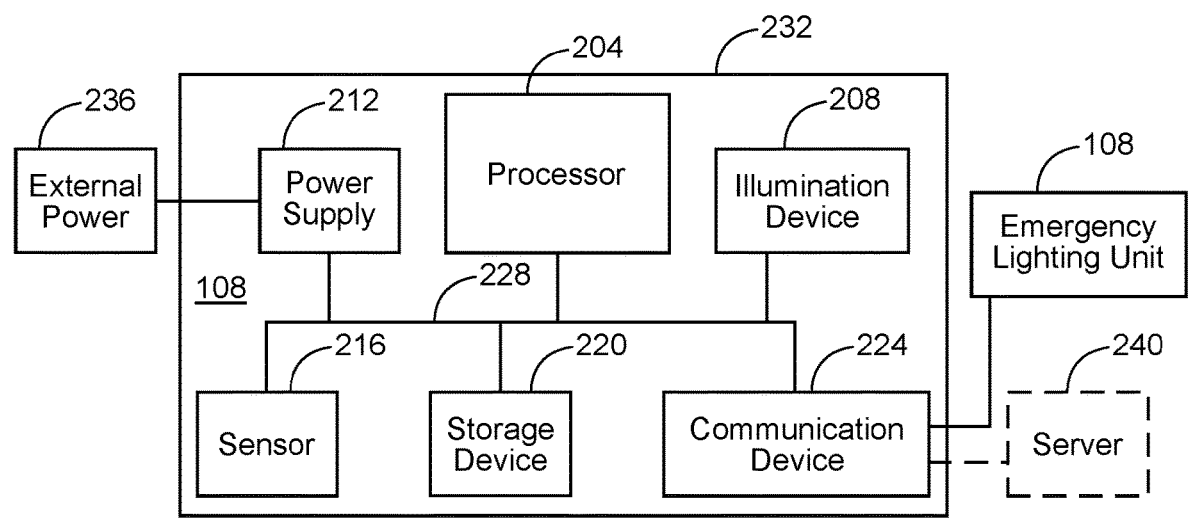
FIG. 2 is a block diagram illustrating an exemplary emergency lighting unit.

Individual emergency lighting units 108 may comprise one or more processors 204, power supplies 212, and illumination devices 208, such as shown in FIG. 2. In addition, an emergency lighting unit 108 may comprise one or more sensors 216, storage devices 220, and communication devices 224. An emergency lighting unit 108 may house its components with an enclosure 232 to which the components may also be mounted or secured.

A processor 204 may be a microprocessor, integrated circuit, microcontroller, ASIC, FPGA, or other circuitry. In one or more embodiments, a processor 204 will execute instructions to provide the functionality disclosed herein (e.g., determining location, generating/processing topology information, detecting hazards). Such instructions may be hardwired in a processor 204 or may be stored on a storage device 220 for retrieval and execution by a processor. A storage device 220 will typically store data on a non-transient storage medium, which excludes carrier waves or signaling. For example, a storage device 220 may store data on a flash medium, magnetic media, optical media, or other non-transient storage medium. A storage device 220 may also or alternatively store topology or mapping information, as will be described further below.

A communication device 224 will typically be capable of communicating wirelessly, such as by transmitting and receiving wireless signals. A communication device 224 will also typically be capable of determining or measuring the relative signal strength of the wireless signals it receives. In such manner, a communication device 224 allows an emergency lighting unit 108 to determine its location. For example, a processor 204 may receiving relative signal strength indicators from a plurality of signal sources, such as other emergency lighting units 108, to determine its location via triangulation or trilateration. It is noted that this topology information and other information may be shared with other emergency lighting units 108 via a communication device 224 as well.

It is contemplated that one or more wired or wireless communication devices 224 may be included in an emergency lighting unit 108. Each type of communication device 224 may be used for particular communications or purposes. For example, in one embodiment, a wireless communication device 224 may be used to determine location while a wired communication device is used to communicate location or other information. Alternatively, a single communication device 224 may be used for multiple types of communication or multiple purposes.

A sensor 216 will typically be provided to detect hazards or other emergency situations. In general, such situations involve occurrences that are potentially harmful or dangerous to occupants. Some exemplary hazards include fires, chemical or radiation exposure, power loss, loss of lighting, unauthorized access, and weapons discharge. As such, various sensors 216 for detecting heat, chemicals, radiation, power outages/issues, light levels, air or other environmental characteristics, movement, noise, and the like may be installed in an emergency lighting unit 108. As can be seen, a sensor 216 may communicate its readings to a processor 204 for further processing and action.

It is contemplated that a sensor 216 may be provided or used to capture relative signal strength indicators instead of or in addition to a communication device 224. For example, in one embodiment, a sensor 216 may comprise a signal strength measurement device used to determine relative signal strength of signals at an emergency lighting unit 108, while a communication device 224 may be used for communicating location and other information.

An illumination device 208 will typically provide lighting during an emergency situation. For example, if a sensor 216 detects a power outage or loss of lighting, an illumination device 208 may be activated to light its vicinity. This aids in the movement and egress of occupants to increase safety thereof. An illumination device 208 may also provide lighting for signage during an emergency or during nominal conditions (i.e., non-emergency situations). For example, an illumination device 208 may illuminate an "exit" sign or other signage or indicator.

A power supply 212 will typically provide a power source that is independent of the building or other environment of an emergency lighting unit 108. For example, a power supply 212 may comprise one or more batteries. A power supply 212 may utilize utility power or another external power source 236 during nominal conditions. Such power may be used to charge a power supply 212 as well. When utility or other external power source 236 is not available, such as during an outage, a power supply 212 may power its emergency lighting unit 108 to help ensure it is operational during emergency situations.

Various components of an emergency lighting unit 108 may communicate via a bus 228, such as shown. It is noted that various other interconnection schema may be utilized in the various embodiments of the emergency lighting system herein.

As shown in FIG. 2, an emergency lighting system comprising a plurality of emergency lighting units 108 may optionally be in communication with a server 240 in some embodiments. Typically, a server 240 will be utilized to provide remote access to an emergency lighting system, such as for administering the system and viewing information collected by the system. For example, a server 240 may function as a gateway or bridge for remote access to an emergency lighting system. A server 240 may provide a website, database, application, or other software to facilitate such remote access. For example, a user may access a website to administer or view location and other information of an emergency lighting system via a server 240.

In addition, a server 240 may receive and provide access to the operating status of individual emergency lighting units, including whether any particular emergency lighting unit is not operating normally. A server 240 may also query the operating status of individual emergency lighting units for maintenance purposes. For instance, a server 240 may query and confirm the operating status of emergency lighting units daily, weekly, monthly, or other periodic times. If one or more emergency lighting units are not in a normal operating condition, the same may be communicated to an operator, administrator, or other personnel so that repair can occur.

Figure 3:
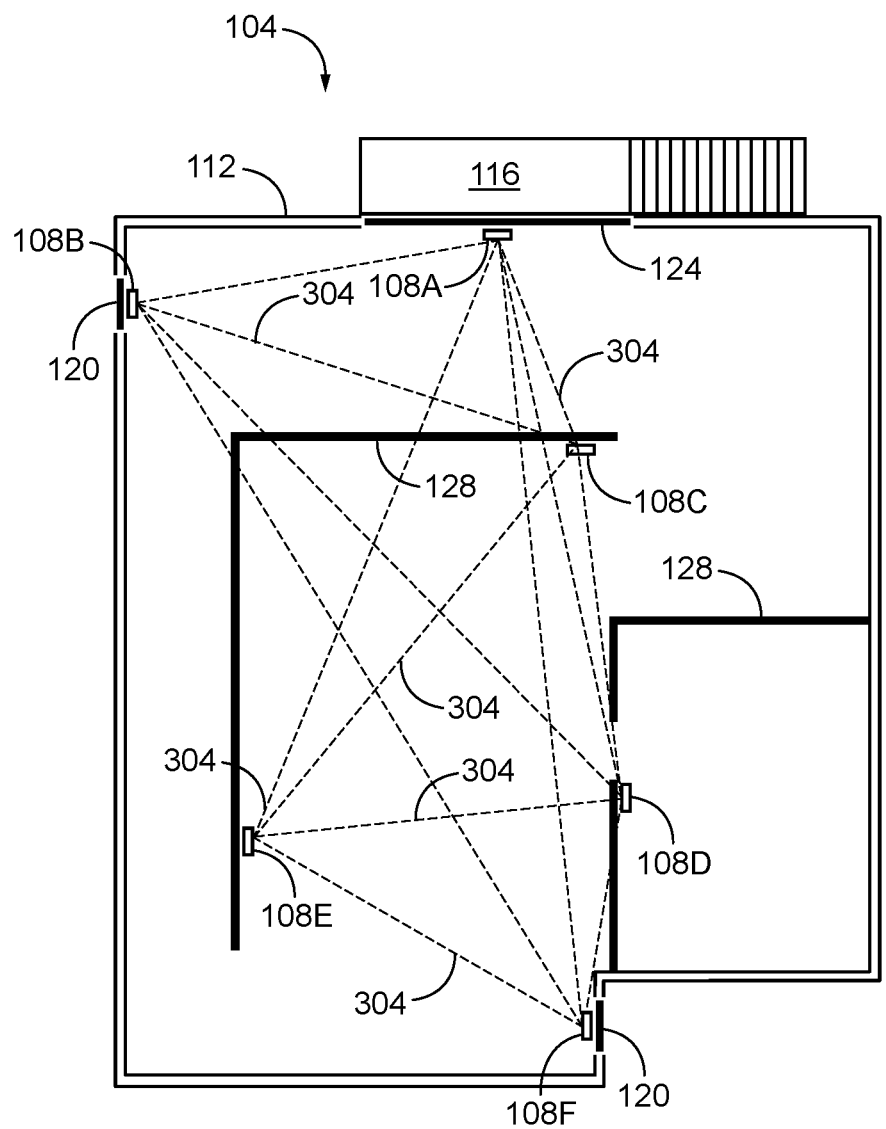
FIG. 3 illustrates an exemplary emergency lighting system in an environment of use.

FIG. 3 illustrates an emergency lighting system 104 in an operational state. Namely, the emergency lighting system 104 is mapping its environment autonomously via its plurality of emergency lighting units 108 to automatically identify egress locations. As described above with regard to FIG. 1, the egress locations are illustrated as doors 120 and windows 124.

As can be seen, individual emergency lighting units 108 may communicate with one another without need for a central hub or bridge, such as in a star or partial star topology like that of a mesh network. For instance, FIG. 3 illustrates exemplary signals 304 shared directly by pairs of emergency lighting units 108. It is noted that individual emergency lighting units 108 may communicate through one or more other emergency lighting units. For example, intermediary emergency lighting units 108 may relay topology or other information between two emergency lighting units, when the two emergency lighting units cannot directly communicate. Communication between emergency lighting units 108 may be hindered or blocked due to physical obstructions or distance for example.

Figure 4:
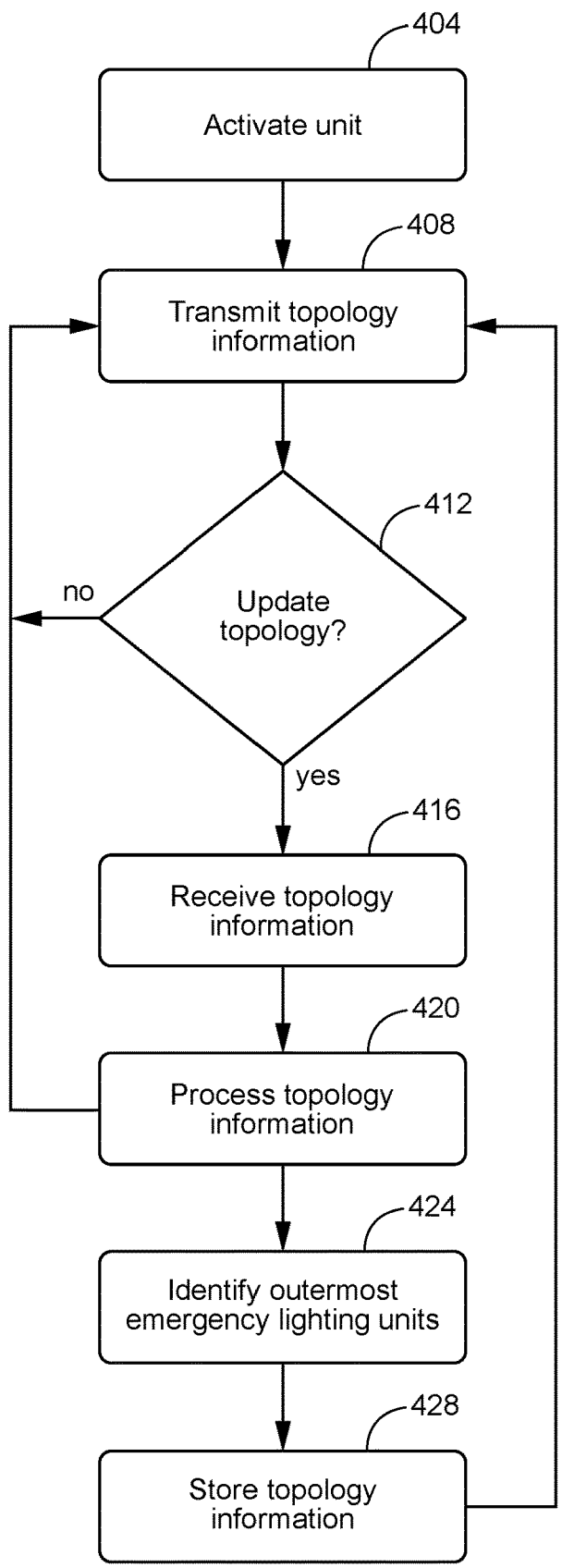
FIG. 4 is a flow diagram illustrating autonomous egress mapping by an exemplary emergency lighting system.

FIG. 4 is a flow diagram illustrating operation of an exemplary emergency lighting unit during mapping or identification of egress locations. Though shown in a particular sequence, it is contemplated that various steps may be performed in one or more distinct sequences. In one or more embodiments, each emergency lighting unit within an emergency lighting system will operate in the same or a similar manner.

At a step 404, an emergency lighting unit, may be activated, such as by turning the emergency lighting unit on. At a step 408, the emergency lighting unit 108A may begin transmitting its topology information, such as via a communication device thereof. Initially, the topology information of the emergency lighting unit may be sparse or limited, because the topology information may only include information relating to the emergency lighting unit itself. For example, initial topology information may be as follows.

| Emergency Lighting Unit ID | Distance | Relative To | Egress Location |
|---|---|---|---|
| 108A | 0 | 108A | Unknown |

As can be seen from the "emergency lighting unit ID" field, this entry of topology information is for the emergency lighting unit 108A itself. It is noted that various unique identifiers may be used. In addition, the "distance" field may be zero since it is for the emergency lighting unit 108A itself, as reflected in the "relative to" field. The "distance" field will typically be populated by a distance measure derived from a relative signal strength of the applicable emergency lighting unit. The "egress location" field has not been set, indicating that it is unknown whether the emergency lighting unit is at an egress location or not.

At a decision step 412, if a topology update is not desired or required, the emergency lighting unit may continue to transmit its known topology information at step 408. If a topology update is to occur, the emergency lighting unit may receive topology information at a step 416. It is noted that emergency lighting units may continuously or periodically update topology information in some embodiments. In other embodiments, an update may be triggered by an occurrence, such as when a particular update signal is received or a new emergency lighting unit is detected.

Typically, topology information will be received from other emergency lighting units within communication range. As can be seen in FIG. 3 for example, an emergency lighting unit 108A may receive topology information via wireless signals 304 from one or more other emergency lighting units 108B, 108C, 108D, 108E.

The topology information may be processed at a step 420, such as to determine distances between emergency lighting units based on the relative signal strengths of the signals 304. The distances may then be used to populate the "distance" field of the topology information. Processing may also include combining topology information received from other emergency lighting units with the topology information stored on a particular emergency lighting unit. It is noted that conflicting topology information for the same subset of emergency lighting units may be discarded in favor of the newest topology information as determined by a timestamp that may be associated with the same.

To illustrate, with regard to the exemplary embodiment of FIG. 3, the topology information for emergency lighting unit 108A in this example may be as follows.

TABLE 1

| Emergency Lighting Unit ID | Distance | Relative To | Egress Location |
|---|---|---|---|
| 108A | 0 | 108A | None |
| 108B | 3.64 | 108A | None |
| 108C | 1.31 | 108A | None |
| 108D | 8.87 | 108A | None |
| 108E | 11.33 | 108A | None |

Exemplary topology information at emergency lighting unit 108B may be as follows.

TABLE 2

| Emergency Lighting Unit ID | Distance | Relative To | Egress Location |
|---|---|---|---|
| 108A | 3.64 | 108B | None |
| 108B | 0 | 108B | None |
| 108C | 5.77 | 108B | None |
| 108D | 12.92 | 108B | None |
| 108F | 19.58 | 108B | None |

Exemplary topology information at emergency lighting unit 108C may be as follows.

TABLE 3

| Emergency Lighting Unit ID | Distance | Relative To | Egress Location |
|---|---|---|---|
| 108A | 1.31 | 108C | None |
| 108B | 5.77 | 108C | None |
| 108C | 0 | 108C | None |
| 108D | 3.42 | 108C | None |
| 108E | 7.03 | 108C | None |

Exemplary topology information at emergency lighting unit 108F may be as follows.

TABLE 4

| Emergency Lighting Unit ID | Distance | Relative To | Egress Location |
|---|---|---|---|
| 108A | 16.93 | 108F | None |
| 108B | 19.58 | 108F | None |
| 108D | 1.21 | 108F | None |
| 108E | 3.91 | 108F | None |
| 108F | 0 | 108F | None |

It is noted that topology information may be shared as other operations of an emergency lighting unit simultaneously occur. For example, after processing topology information at step 420, the topology information can be shared with other emergency lighting units by returning to step 408 where the topology information is transmitted to other emergency lighting units. While topology information is being transmitted, an emergency lighting unit may simultaneously continue to a step 424 where the outermost emergency lighting units are identified.

Over a relatively brief period of transmitting, sharing, receiving and processing topology information by individual emergency lighting units, the topology information will become comprehensive such that distances between all of the emergency lighting units within an emergency lighting system 104 will be stored in the topology information.

At step 424, one or more emergency lighting units may identify the one or more outermost emergency lighting units using the topology information from some or all the emergency lighting units. This may occur in various ways. For example, the topology information may be used to determine or derive a location for each emergency lighting unit. In one or more embodiments, the distances in the topology information relative to an emergency lighting unit may be used as a radius to define a circular orbit around the emergency lighting unit along which another emergency lighting unit may be located. The intersection of plurality of orbits and the center of the orbits may be used to unambiguously determine the location of any particular emergency lighting unit.

Figure 5:
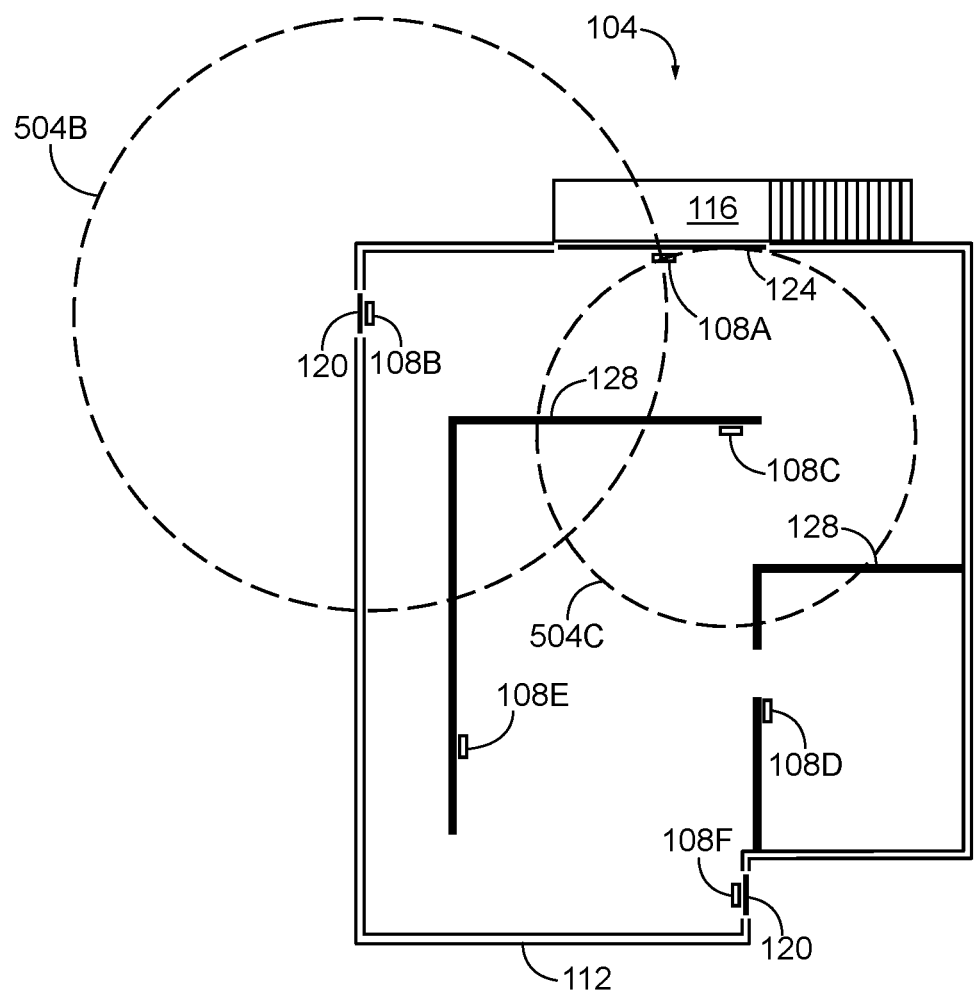
FIG. 5 illustrates an exemplary location determination process in an environment of use.

To illustrate, in the exemplary embodiment of FIG. 5, circular orbits 504B, 504C have been generated based on the distances in the topology information relating to emergency lighting unit 104A as set forth in Tables 1-3. A circular orbit represents a path along which an emergency lighting unit may be located, based on the distance to the emergency lighting unit in set forth in the topology information. Only a subset of the circular orbits defined in the topology information has been illustrated in the figures for clarity purposes.

The exemplary circular orbit 504B is accordingly generated using a radius defined by the distance between emergency lighting unit 104B and emergency lighting unit 108A. Likewise, circular orbit 504C is generated based on the distances between emergency lighting unit 108A and emergency lighting units 108C. Each of the emergency lighting units 104B, 108C are at the center of their respective circular orbits 504B, 504C. According to the topology information described thus far, emergency lighting unit 108A must be somewhere along circular orbit 504A and circular orbit 504B, namely at an intersection of these circular orbits.

Figure 6:
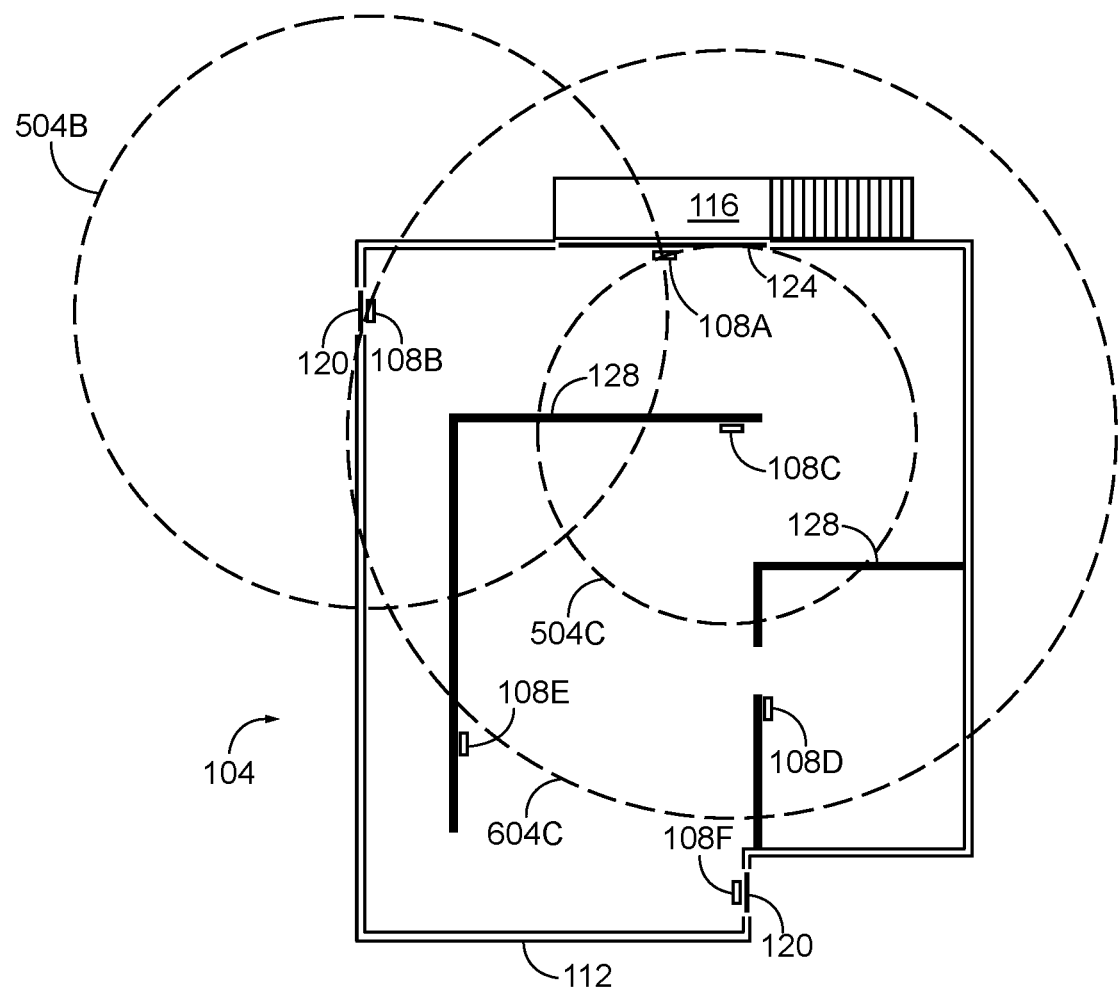
FIG. 6 illustrates an exemplary location determination process in an environment of use.

In FIG. 6, circular orbit 604B has been added, also based on the distance between emergency lighting units 108B, 108C as defined in the topology information. This additional topology information allows the location of the emergency lighting units 108A, 108B, 108C to be determined. To illustrate, emergency lighting unit 108A must be at a location on circular orbits 504B, 504C and emergency lighting unit 108B must be at a location on circular orbit 604C, all while having the distances between emergency lighting units 108A, 108B, 108C match the distances in the topology information. When all these conditions are met the points on circular obits 504B, 504C, 604C where emergency lighting units 108A, 108B, 108C are located relative to one another have been determined.

In one or more embodiments, circular orbits may be rotated about an intersection until a distance condition is met to determine relative locations of their associated emergency lighting units. For example, to determine relative locations, circular orbits 504B, 504C can be rotated about an intersection until their associated emergency lighting units 108B, 108C are at the distance specified in the relevant topology information. The distance between emergency lighting units can be evaluated as the circular orbits are rotated to determine if the distance matches. Stated another way, circular orbits 504B, 504C can be rotated an intersecting point until the center of circular orbit 504B (i.e., emergency lighting unit 108B) lies on a point along circular orbit 604C to determine relative locations.

A subset of the topology information has been used above to determine relative locations of emergency lighting units 108A, 108B, 108C. It can be seen that, as increasing amounts of topology information is taken into account, a location map for the emergency lighting units within an emergency lighting system 104 may be generated. Such location map will typically include coordinates identifying the locations of the emergency lighting units relative to one another within an emergency lighting system 104. For example, a location map may comprise an x, y or latitude, longitude coordinate system, or the like. The coordinates for emergency lighting units may be incorporated into the topology information.

In one or more embodiments, if insufficient topology information exists to unambiguously determine the location of one or more emergency lighting units, it is contemplated that the emergency lighting system 104, such as via a communication device of one or more emergency lighting units, may issue a notification or alert regarding the same.

It is noted that the mapping of locations may be generated in various ways. For example, relative signal strength indicators or distance may be used to triangulate the location of individual emergency lighting units, once the location of a sufficient number of emergency lighting units is determined or otherwise known. In one or more embodiments, once the location of three or more emergency lighting units is known, the location of other emergency lighting units may be triangulated using the locations of various subsets of the locations of three emergency lighting units. In addition or alternatively, locations may be determined via trilateration, time of arrival estimation, or the like.

The location map may then be used to identify the outermost emergency lighting units at step 424. For example, the outermost emergency lighting units can be identified by identifying the emergency lighting units with the outermost coordinates in the mapping. Typically, the outermost emergency lighting units 108 will be at a building's egress locations. This is due, in part, to the egress locations typically being at the periphery of buildings and to the desirability of having emergency illumination located at egress locations.

To illustrate, in FIG. 3, the outermost emergency lighting units 108A, 108B, 108F are at the egress locations of the building 112, namely, the doors 120 and windows 124 of the building. Accordingly, identifying the outermost emergency lighting units 108A, 108B, 108F identifies and maps the egress locations.

Once the outermost emergency lighting units are identified, the topology information may then be updated to include the same, such in an "egress location" field as in the following exemplary topology information.

| Emergency Lighting Unit ID | Distance | Relative To | Egress Location |
|---|---|---|---|
| 108A | 0 | 108A | Yes |
| 108B | 3.64 | 108A | Yes |
| 108C | 1.31 | 108A | No |
| 108D | 8.87 | 108A | No |
| 108E | 11.33 | 108A | No |
| 108A | 3.64 | 108B | Yes |
| 108B | 0 | 108B | Yes |
| 108C | 5.77 | 108B | No |
| 108D | 12.92 | 108B | No |
| 108F | 19.58 | 108B | Yes |
| 108A | 16.93 | 108F | Yes |
| 108B | 19.58 | 108F | Yes |
| 108D | 1.21 | 108F | No |
| 108E | 3.91 | 108F | No |
| 108F | 0 | 108F | Yes |

It is contemplated that, in relatively few situations, the outermost emergency lighting units may not be at an egress location. For example, in the off chance a building only has one egress location, the outermost emergency lighting units may not properly identify egress locations. As such, an operator, administrator, or other personnel may manually indicate one or more emergency lighting units are not egress locations.

At a step 428, the topology information may be stored, such as on a storage device of one or more emergency lighting units. In one or more embodiments, each emergency lighting unit will store the topology information on a storage device. As set forth above, the emergency lighting unit may then return to step 408 where the topology information is transmitted or shared to other emergency lighting units.

In some embodiments, one or more emergency lighting units may have reference location information. A reference location will typically be used to provide additional detail regarding the location of egress locations. Exemplary topology information with reference locations is provided in the following table.

TABLE 5

| Emergency Lighting Unit ID | Reference Location | Distance | Relative To | Egress Location |
|---|---|---|---|---|
| 108A | North | 0 | 108A | Yes |
| 108B | | 3.64 | 108A | Yes |
| 108C | | 1.31 | 108A | No |
| 108D | | 8.87 | 108A | No |
| 108E | | 11.33 | 108A | No |
| 108A | North | 3.64 | 108B | Yes |
| 108B | | 0 | 108B | Yes |
| 108C | | 5.77 | 108B | No |
| 108D | | 12.92 | 108B | No |
| 108F | | 19.58 | 108B | Yes |
| 108A | North | 16.93 | 108F | Yes |
| 108B | | 19.58 | 108F | Yes |
| 108D | | 1.21 | 108F | No |
| 108E | | 3.91 | 108F | No |
| 108F | | 0 | 108F | Yes |

As can be seen, emergency lighting unit 108A has been assigned the reference location "north." With this information, an emergency lighting system 104 can determine the cardinal locations of the outermost emergency lighting units to generate derived reference locations. For example, when emergency lighting unit 108A is "north," the diametrically opposed outermost emergency lighting unit 108F must be "south." Likewise, emergency lighting unit 108B is "northwest." The reference location and derived reference location can be used to direct occupants to a particular egress location during an emergency situation, as will be described further below.

A reference location also allows an emergency lighting system 104 to automatically orient itself and provide egress directions with only relative topology information. The identification of a cardinal location for an emergency lighting unit 108 may be a manual process conducted by an operator, administrator, or other personnel. Alternatively, the process may be automated such as by determining the relative location of one or more emergency lighting units 108 to a fixed point, beacon, or other device having a known cardinal location, such as via relative signal strength indicators.

In another alternate embodiment, a subset of emergency lighting units 108 may be manufactured, programmed, or otherwise designated for installation at a particular cardinal location within an emergency lighting system 104. For example, a first emergency lighting unit 108 may be designated for installation at a northern or southern portion of an emergency lighting system 104, while a second emergency lighting unit 108 may be designated for installation at a western or eastern portion of the emergency lighting system. The remainder of emergency lighting units in the emergency lighting system 104, including the outermost emergency lighting units, can then determine their cardinal location based on the topology information of the first and second emergency lighting units 108. It is contemplated that the designator may be a visual indicator, such as a label or other distinguishing feature, in some embodiments.

Figure 7:
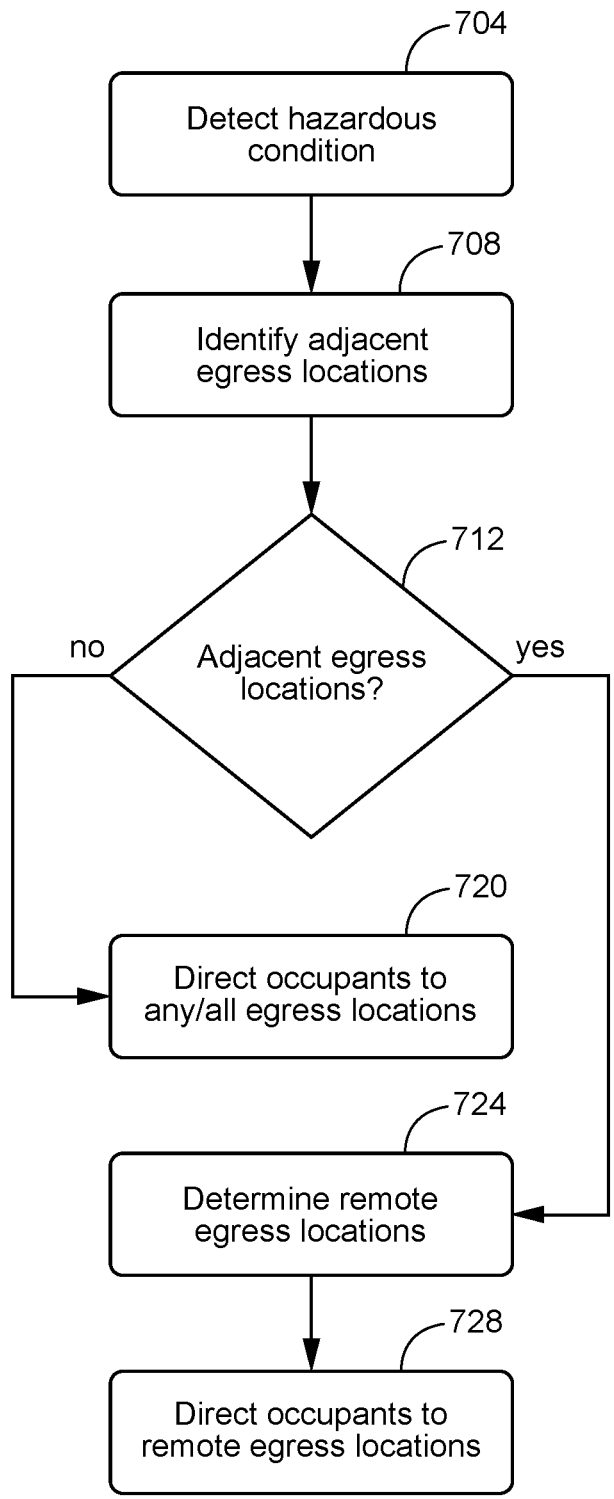
FIG. 7 is a flow diagram illustrating operation of an exemplary emergency lighting system during a hazard.

FIG. 7 illustrates operation of an exemplary emergency lighting system during an emergency situation. Generally speaking, an emergency lighting system utilizes the topology information to locate a hazard and direct occupants to an egress location remote from the hazard. Operation of the emergency lighting system will be described with reference to FIGS. 8A and 8B.

Figure 8A:
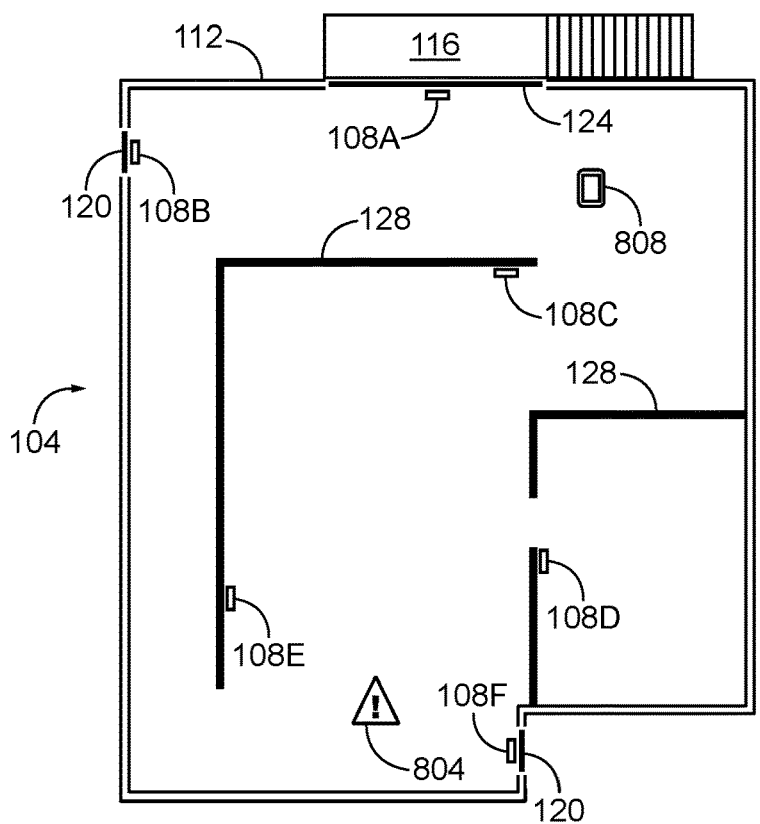
FIG. 8A illustrates an exemplary emergency lighting system in an environment of use having a hazard.
Figure 8B:
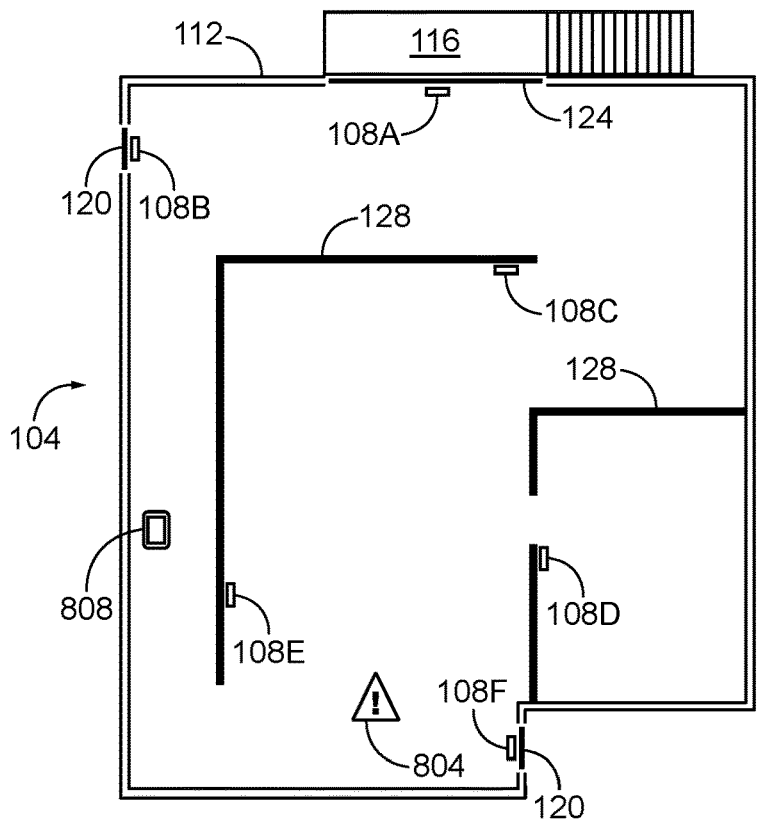
FIG. 8B illustrates an exemplary emergency lighting system in an environment of use having a hazard.

At a step 704, an emergency situation or other hazard 804 is detected by one or more emergency lighting units, such as via one or more of their sensors. At a step 708, adjacent egress locations may be identified so as to route or otherwise direct occupants to a safe exit. In one or more embodiments, this may occur by identifying the emergency lighting units that detected the hazard. In the example of FIGS. 8A and 8B, emergency lighting unit 108F is also at an egress location, as shown in Table 5.

At a decision step 712, if the hazard is not adjacent any egress location, occupants may be directed to evacuate via any or all of the egress locations at a step 720. If the hazard is adjacent an egress location, such as in the exemplary embodiments of FIGS. 8A and 8B, occupants may be directed to evacuate via one or more remote egress locations.

Suitable remote egress locations may be determined at a step 724 by querying the topology information. In one or more embodiments, one or more egress locations that are not adjacent the hazard 804 may be deemed remote egress locations. It is contemplated that egress locations beyond a predefined distance of a hazard or adjacent egress location thereof may be deemed a remote egress location as well. In addition, the egress location furthest away from a hazard or adjacent egress location may be deemed a remote egress location.

At a step 728, occupants may be directed to the one or more remote egress locations. This may occur in various ways. For example, an alert or other notification may be transmitted to an occupant's mobile device 808, which may be a smartphone, tablet, laptop, pager, or the like. The notification may identify a particular egress location, such as "exit via north exit" or "exit via northwest exit," the cardinal location of which may be autonomously determined as described above. The notification may be transmitted by one or more emergency lighting units or by a designated emergency lighting unit, server, or other device designated for this purpose.

It is contemplated that a notification may be audible in some embodiments. For example, a speaker may output a notification to evacuate. In addition, the notification may include directions, such as disclosed above, directed occupants to one or more particular egress locations.

In one or more embodiments, the egress locations referenced with regard to steps 720-728 may be determined on a per occupant basis, such as to direct occupants to an egress location based on their current location. As shown in FIGS. 8A and 8B for example, the occupants, as represented by their mobile devices 808, are at different locations. In one or more embodiments, at step 720, the egress location may be the closest egress location to an occupant's current location. If a hazard is adjacent an egress location, the egress location, at step 724, may be the closest egress location that is also remote from the hazard. In the examples of FIGS. 8A and 8B, the closest egress locations would respectively be at emergency lighting units 108A, 108B.

It is contemplated that a plurality of egress locations may be transmitted to an occupant's mobile device 808. In some embodiments, the plurality of egress locations may be prioritized based on their distance from the occupant's current location. The plurality of transmitted egress location may include all egress locations in some embodiments, with those adjacent a hazard being so identified for the occupant.

An occupant's location may be determined by one or more emergency lighting units. For example, an occupant's location may be determined by triangulation or trilateration based on relative signal strength of their mobile device 808 at a plurality of emergency lighting units. The location of the emergency lighting units can be retrieved from the topology information for use in triangulation, trilateration, or otherwise locating an occupant.

In some embodiments, signage, loudspeakers, or the like may be used to direct occupants to one or more egress locations via visual or audible output. It is contemplated that such output devices may be provided with one or more emergency lighting units.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An emergency lighting system for a building comprising:
    a plurality of emergency lighting units comprising one or more illumination devices and one or more communication devices, wherein topology information is generated based on relative signal strength of one or more signals transmitted and received between the plurality of emergency lighting units via the one or more communication devices; and
    one or more storage devices that store the topology information;
    wherein the topology information identifies the location of one or more outermost emergency lighting units to identify the location of one or more egress locations of the building;
    wherein upon occurrence of an emergency situation, the one or more illumination devices of at least one of the one or more outermost emergency lighting units are activated.

2. The emergency lighting system of claim 1, wherein at least one of the plurality of emergency lighting units determine one or more occupant locations based on relative signal strength of one or more signals of one or more mobile devices.

3. The emergency lighting system of claim 1, wherein the topology information is remotely accessible.

4. An emergency lighting system for a building comprising:
    a plurality of emergency lighting units comprising one or more illumination devices and one or more communication devices, wherein topology information is generated based on relative signal strength of one or more signals transmitted and received between the plurality of emergency lighting units via the one or more communication devices;
    wherein the topology information identifies the location of one or more outermost emergency lighting units to identify the location of the one or more egress locations of the building;
    wherein upon occurrence of an emergency situation, the one or more illumination devices of at least one of the one or more outermost emergency lighting units are activated.

5. The emergency lighting system of claim 4, further comprising one or more storage devices that store the topology information.

6. The emergency lighting system of claim 4, wherein at least one of the plurality of emergency lighting units determine one or more occupant locations based on relative signal strength of one or more signals of one or more mobile devices.

7. The emergency lighting system of claim 4, wherein the topology information is remotely accessible.

8. An emergency lighting system for a building comprising:
- a plurality of emergency lighting units comprising one or more illumination devices and one or more communication devices, wherein topology information is generated based on relative signal strength of one or more signals transmitted and received between the plurality of emergency lighting units via the one or more communication devices;
- wherein the topology information identifies the location of one or more outermost emergency lighting units to identify the location of the one or more egress locations of the building;
- wherein the emergency lighting system determines one or more occupant locations based on relative signal strength of one or more signals of one or more mobile devices;
- wherein upon occurrence of an emergency situation, the one or more illumination devices of at least one of the one or more outermost emergency lighting units are activated.

9. The emergency lighting system of claim 8, further comprising one or more storage devices that store the topology information.

10. The emergency lighting system of claim 8, wherein the topology information is remotely accessible.

\* \* \* \* \*